(12) United States Patent
Cheng

(10) Patent No.: US 7,458,711 B2
(45) Date of Patent: Dec. 2, 2008

(54) BACKLIGHT MODULE WITH GROOVED LIGHT GUIDE PLATE FIXING LIGHT SOURCE THEREIN

(75) Inventor: Yu-Cheng Cheng, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 149 days.

(21) Appl. No.: 11/510,885

(22) Filed: Aug. 28, 2006

(65) Prior Publication Data

US 2007/0047263 A1    Mar. 1, 2007

(30) Foreign Application Priority Data

Aug. 26, 2005 (TW) .............................. 94129260 A

(51) Int. Cl.
*F21V 7/10* (2006.01)
*G02B 6/10* (2006.01)

(52) U.S. Cl. .................. 362/621; 362/614; 362/612; 349/65; 349/70

(58) Field of Classification Search ................. 362/621, 362/614, 561, 26, 27, 612; 349/26, 27
See application file for complete search history.

(56) References Cited

U.S. PATENT DOCUMENTS

| | | | | |
|---|---|---|---|---|
| 4,487,481 A | * | 12/1984 | Suzawa | 349/70 |
| 4,618,216 A | * | 10/1986 | Suzawa | 349/65 |
| 4,903,172 A | * | 2/1990 | Schoniger et al. | 362/612 |
| 6,036,328 A | * | 3/2000 | Ohtsuki et al. | 362/612 |
| 6,286,971 B1 | * | 9/2001 | Hori | 362/614 |
| 6,339,418 B1 | * | 1/2002 | Kitagawa | 349/65 |
| 6,631,998 B2 | * | 10/2003 | Egawa et al. | 362/612 |
| 6,848,800 B2 | | 2/2005 | Kim | |
| 6,871,972 B2 | * | 3/2005 | Ju | 362/614 |
| 2004/0004827 A1 | * | 1/2004 | Guest | 362/614 |
| 2005/0180171 A1 | * | 8/2005 | Huang et al. | 362/27 |
| 2006/0146574 A1 | * | 7/2006 | Fu et al. | 362/614 |
| 2006/0158901 A1 | * | 7/2006 | Wang | 362/612 |
| 2007/0086179 A1 | * | 4/2007 | Chen et al. | 362/613 |

* cited by examiner

*Primary Examiner*—Ismael Negron
(74) *Attorney, Agent, or Firm*—Wei Te Chung

(57) ABSTRACT

A backlight module includes a light source assembly and a light guide plate. The light guide plate includes a side surface, a light emission surface substantially perpendicular to the side surface, and a first groove defined at the side surface. The first groove fixedly accommodates the light source assembly.

3 Claims, 9 Drawing Sheets

BACKLIGHT MODULE WITH GROOVED LIGHT GUIDE PLATE FIXING LIGHT SOURCE THEREIN

FIELD OF THE INVENTION

The present invention relates to backlight modules typically used in liquid crystal displays (LCDs), and particularly to a backlight module including a grooved light guide plate and a light source accommodated in the groove.

GENERAL BACKGROUND

A typical liquid crystal display is capable of displaying a clear and sharp image through millions of pixels that make up the complete image. The liquid crystal display has thus been applied to various electronic equipment in which messages or pictures need to be displayed, such as mobile phones and notebook computers. However, liquid crystals in the liquid crystal display do not themselves emit light. Rather, the liquid crystals have to be lit up by a light source so as to clearly and sharply display text and images. The light source may be ambient light, or a backlight module attached to the liquid crystal display.

Referring to FIGS. 11, 12 and 13, a typical backlight module 1 generally includes a metal tray 11 having supporting portions 111, a light source reflector 13 having a U-shaped cross-section, a light source assembly 14, a light guide plate 16 disposed on the metal tray 11, a reflective plate 15 disposed below the light guide plate 16, a diffusing plate 17 disposed above the light guide plate 16, and a plastic frame 12. The plastic frame 12 cooperates with the metal tray 11 to accommodate the U-shaped light source reflector 13, the light source assembly 14, the reflective plate 15, the light guide plate 16, and the diffusing plate 17. The light guide plate 16 includes a light incident surface 161 perpendicular to the metal tray 11, and a side surface 162 which is also perpendicular to the metal tray 11 and which perpendicularly adjoins the light incident surface 161. The side surface 162 includes a plurality of protrusions 163 extending perpendicularly outwardly therefrom. The supporting portions 111 of the metal tray 11 correspond to respective gaps defined between adjacent protrusions 163 of the light guide plate 16. That is, the supporting portions 111 can cooperate with the protrusions 163 to fix the light guide plate 16 to the metal tray 11. The light source assembly 14 is located adjacent to the light incident surface 161 of the light guide plate 16. The light source assembly 14 includes a linear light source 141, a pair of fasteners 142 for fastening the light source 141 in the light source reflector 13, and a plurality of O-shaped rings 143 nested on the light source 141 for protecting the light source 141.

If the backlight module 1 is subjected to shock or jarring, action and reaction forces occur between the metal tray 11 and the light guide plate 16. Because the protrusions 163 of the light guide plate 16 cooperatively fit with the supporting portions 111 of the metal tray 11, action and reaction forces therebetween may cause the metallic supporting portions 111 to cut the protrusions 163 or even break the protrusions 163 off from a main body of the light guide plate 16. If the protrusions 163 are no longer held in place by the supporting portions 111, the light guide plate 16 is liable to collide with and cause damage to the light source 141. Thus the reliability of the backlight module 1 may not be satisfactory, particularly in higher-risk applications and during transportation.

Therefore, a new backlight module that can overcome the above-described problems is desired.

SUMMARY

In a preferred embodiment, a backlight module includes a light source assembly and a light guide plate. The light guide plate includes a side surface, a light emission surface substantially perpendiculars to the side surface, and a first groove defined at the side surface. The first groove fixedly accommodates the light source assembly.

Other advantages and novel features will become more apparent from the following detailed description when taken in conjunction with the accompanying drawings. All the views in the drawings are schematic.

DETAILED DESCRIPTION OF PREFERRED EMBODIMENTS

Figure 1:
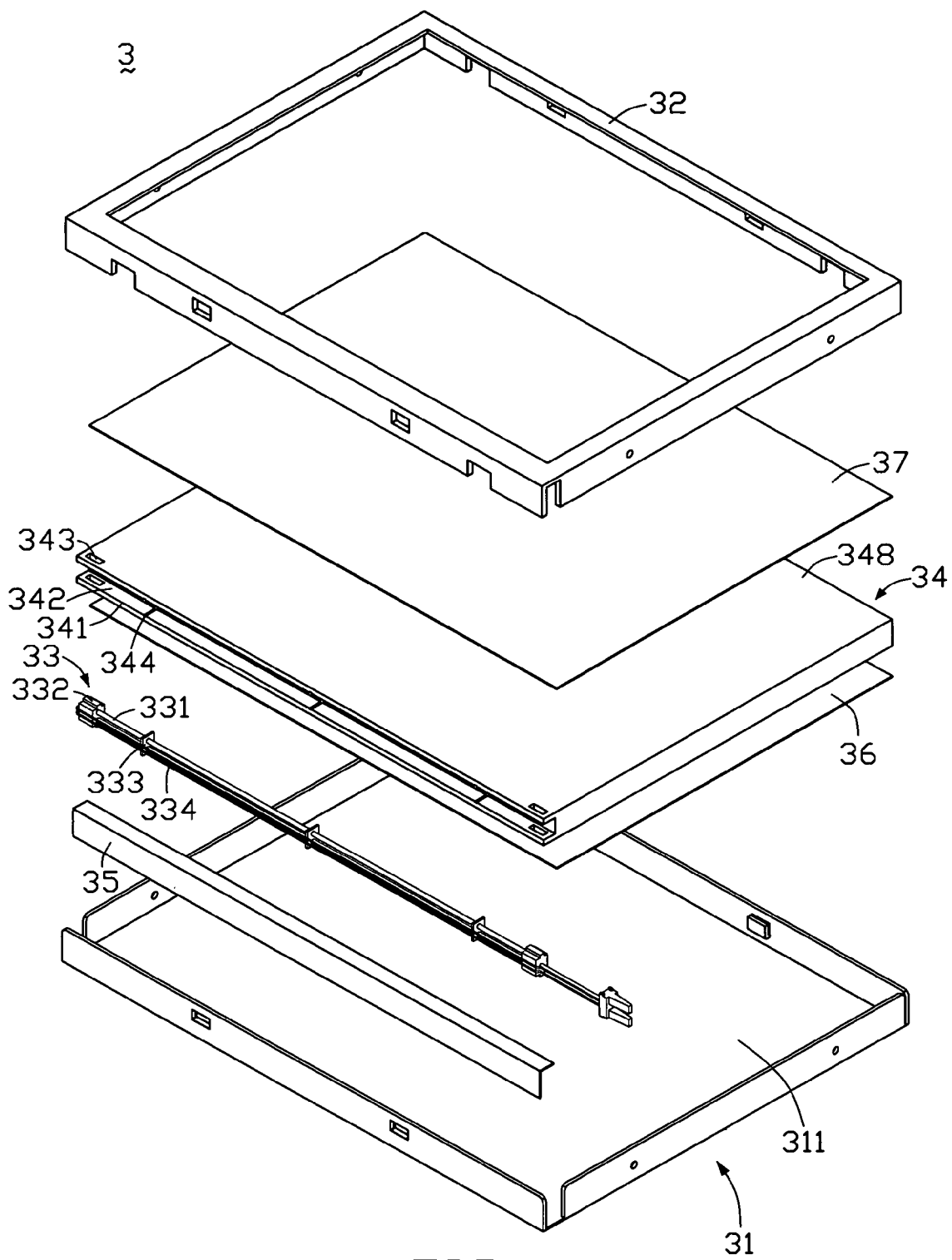
FIG. 1 is an exploded, isometric view of a backlight module according a first embodiment of the present invention.
Figure 2:
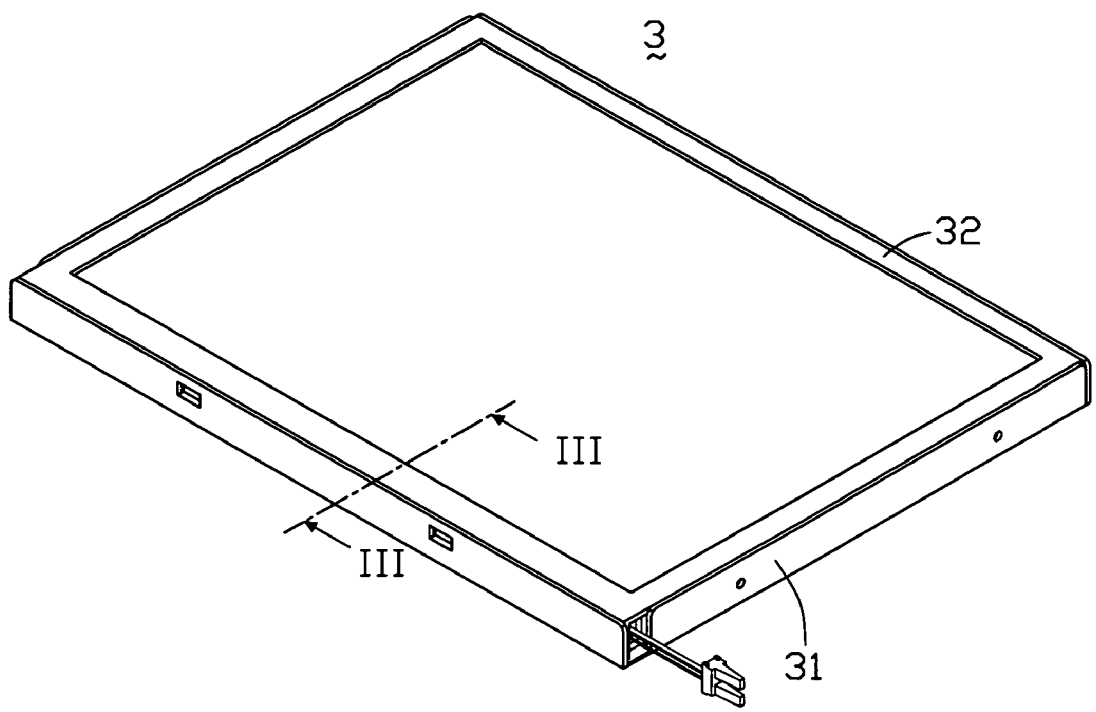
FIG. 2 is an assembled view of the backlight module of FIG. 1.
Figure 3:
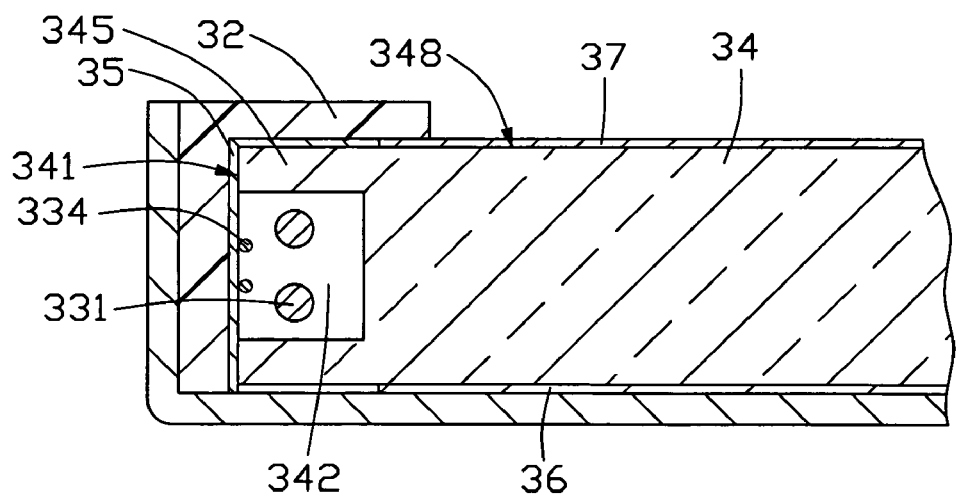
FIG. 3 is an enlarged, cross-sectional view taken along line III-III of FIG. 2.

Referring to FIGS. 1, 2, and 3, a backlight module 3 according to a first embodiment of the present invention includes a tray 31 having an inner bottom surface 311, a light source assembly 33, a light guide plate 34, a light source reflector 35, a reflective plate 36, a diffusing plate 37, and a plastic frame 32. The reflective plate 36, the light guide plate 34, and the diffusing plate 37 are disposed between the tray 31 and the plastic frame 32, in that order from bottom to top. The tray 31 may be made of metal, such as aluminum.

The light source assembly 33 includes two parallel linear light sources 331, two fasteners 332 for respectively fastening opposite ends of the light sources 331, a plurality of rectangular fixing plates 333 nested around the two light sources 331, and high and low voltage wires 334 electrically connected to the opposite ends of the light sources 331. The light sources 331 may be cold cathode fluorescent lamps (CCFLs).

The light guide plate 34 is rectangular, and includes a light emission surface 348 and a side surface 341 perpendicularly adjoining the emission surface 348. The side surface 341 has a first groove 342 defined thereat, thus defining two sidewalls 345 of the light guide plate 34 that bound top and bottom extremities of the first groove 342. A long axis of the first groove 342 is substantially parallel to the emission surface 348 of the light guide plate 34. Two pairs of notches 343 are defined at two ends of the sidewalls 345 respectively. The notches 343 each penetrate through the corresponding sidewall 345. A plurality of pairs of shallow slots 344 are defined in inner surface portions of the sidewalls 345. The light source assembly 33 is accommodated in the first groove 342. The two pairs of notches 343 respectively correspond to the two fasteners 332 of the light source assembly 33, and accommodate protrusions of the fasteners 332 therein to thereby fix the light source assembly 33 to the light guide plate 34. Each pair of shallow slots 344 respectively corresponds to one fixing plate 333 of the light source assembly 33, and fixedly receives top and bottom ends of the fixing plate 333 therein to thereby protect the light sources 331 from being bent. The light source reflector 35 covers an exposed side of the light source assembly 33.

Because the light guide plate 34 includes the first groove 342 accommodating the light source assembly 33, if the backlight module 3 is subjected to shock or jarring, the light source 331 is prevented from being impacted by the light guide plate 34. Moreover, with the cooperation of the notches 343 and the fasteners 332, and the cooperation of the shallow slots 344 and the fixing plates 333, the light source 331 is tightly fixed to the light guide plate 34. Therefore, the backlight module 3 has high reliability.

Figure 4:
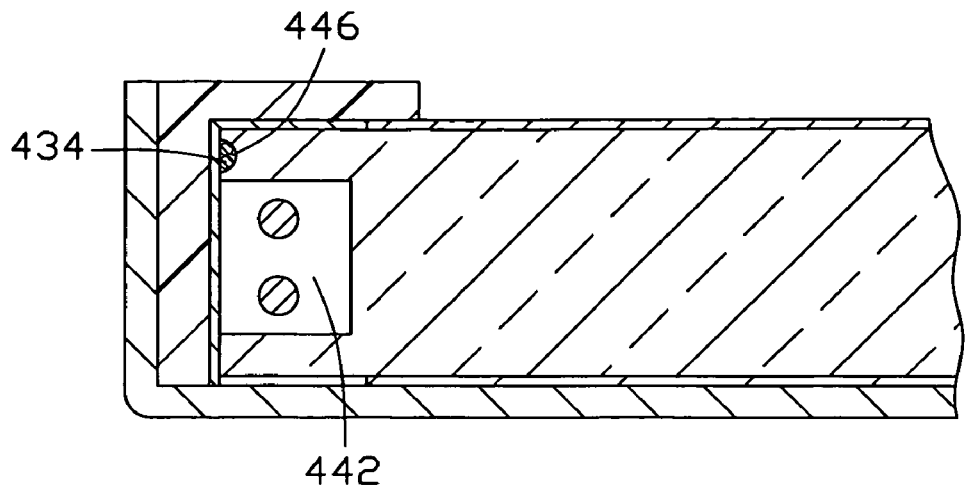
FIG. 4 is similar to FIG. 3, but showing a corresponding view in the case of a backlight module according a second embodiment of the present invention.

Referring to FIG. 4, a backlight module according to a second embodiment of the present invention is similar to the backlight module 3 of the first embodiment. However, the backlight module of the second embodiment further includes a second groove 446 located above and substantially parallel to a first groove 442. High and low voltage wires 434 connecting with the light source 331 are accommodated in the second groove 446.

Figure 5:
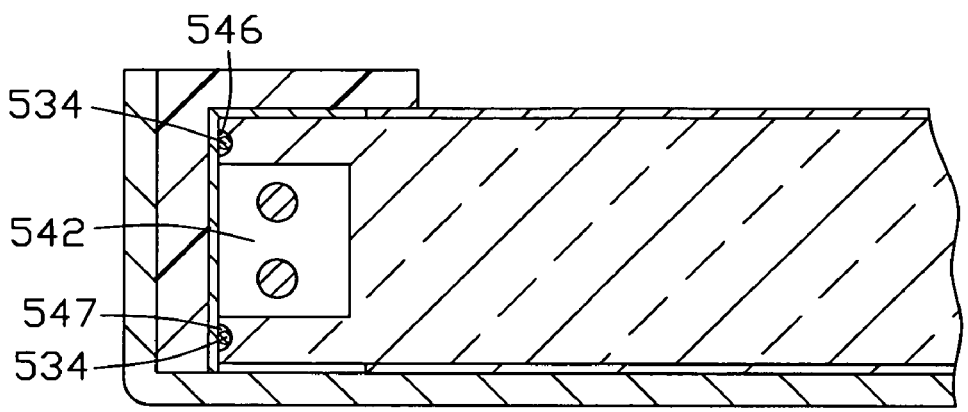
FIG. 5 is similar to FIG. 3, but showing a corresponding view in the case of a backlight module according a third embodiment of the present invention.

Referring to FIG. 5, a backlight module according to a third embodiment of the present invention is similar to the backlight module of the second embodiment. However, the backlight module of the third embodiment further includes a third groove 547. A second groove 546 and the third groove 547 are respectively located above and below a first groove 542, and are both substantially parallel to the first groove 542. High and low voltage wires 534 are respectively accommodated in the second and third grooves 546, 547.

Figure 6:
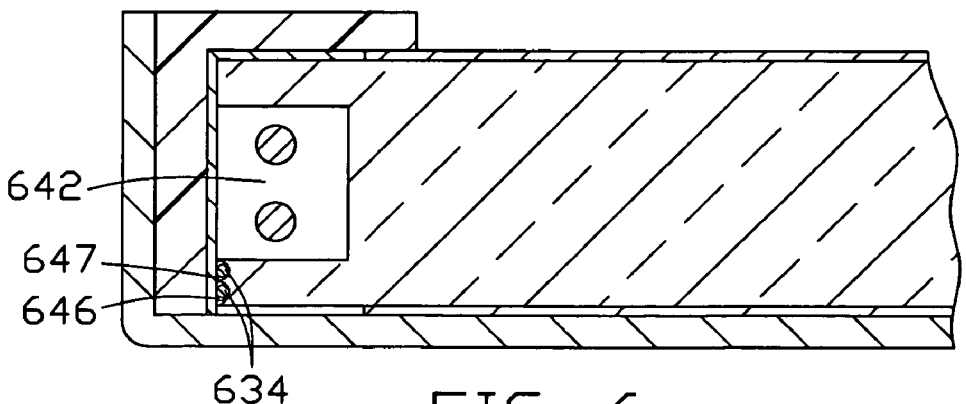
FIG. 6 is similar to FIG. 3, but showing a corresponding view in the case of a backlight module according a fourth embodiment of the present invention.

Referring to FIG. 6, a backlight module according to a fourth embodiment of the present invention is similar to the backlight module of the third embodiment. However, a second groove 646 and a third groove 647 are both located below a first groove 642, and are both substantially parallel to the first groove 642. High and low voltage wires 634 are respectively accommodated in the second and third grooves 646, 647.

Figure 7:
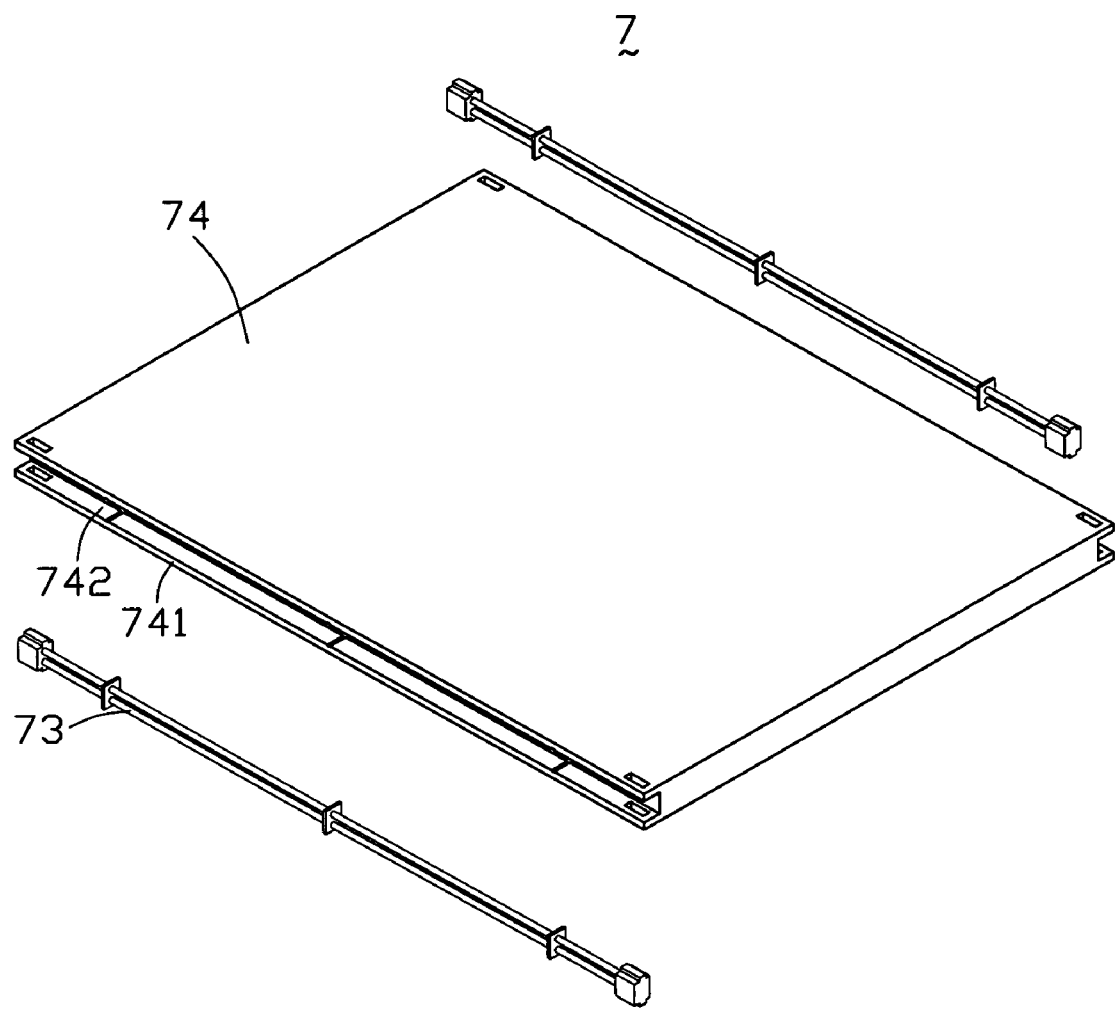
FIG. 7 is an exploded, isometric view of a backlight module according a fifth embodiment of the present invention.

Referring to FIG. 7, a backlight module 7 according to a fifth embodiment of the present invention is similar to backlight module 3 of the first embodiment. However, the backlight module 7 includes a light guide plate 74 and two light source assemblies 73. The light guide plate 74 includes two first grooves 742 respectively defined at two opposite side surfaces 741 thereof. Each first groove 742 fixedly accommodates a respective light source assembly 73 therein.

Figure 8:
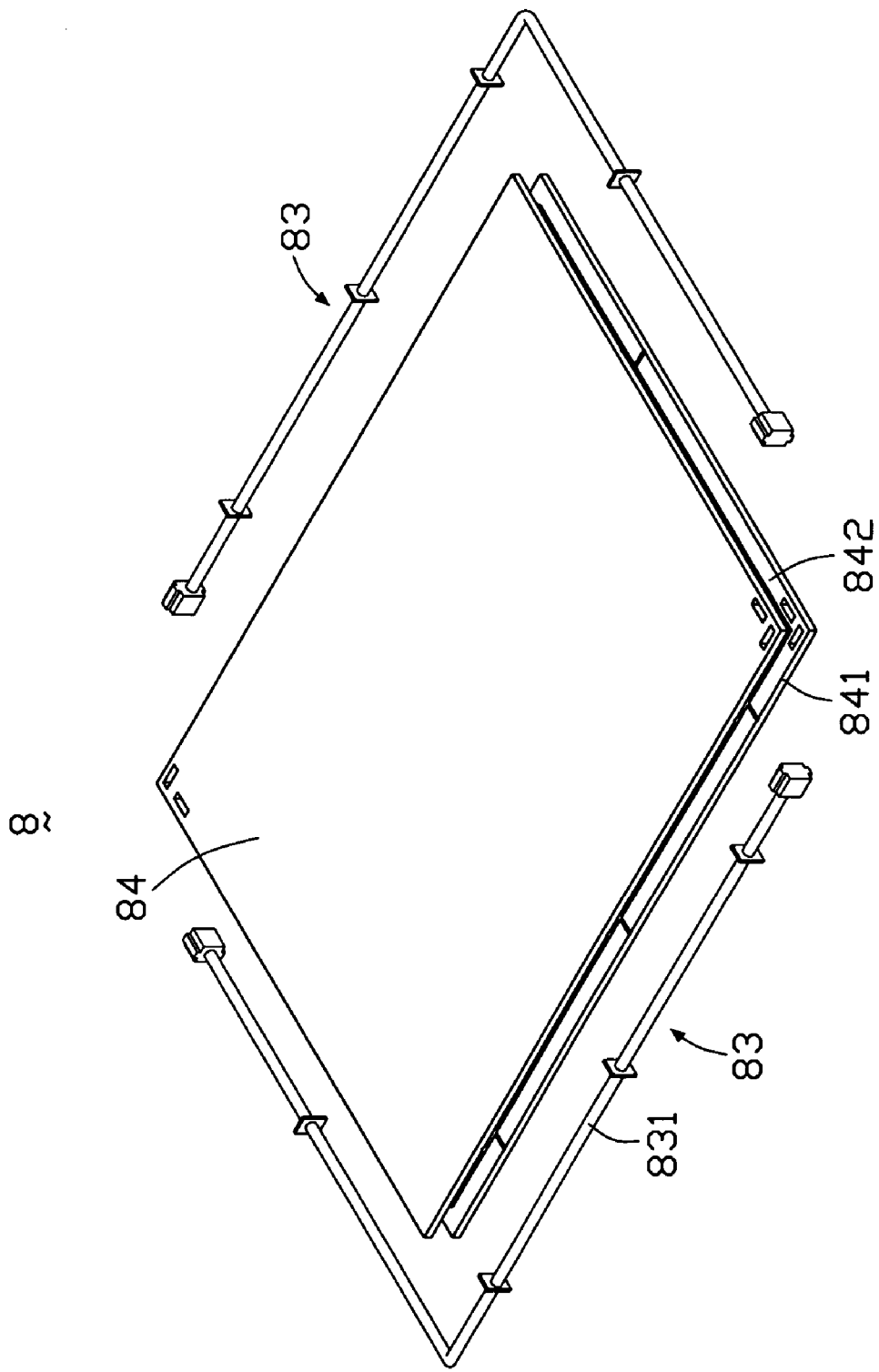
FIG. 8 is an exploded, isometric view of a backlight module according a sixth embodiment of the present invention.

Referring to FIG. 8, a backlight module 8 according to a sixth embodiment of the present invention is similar to the backlight module 3 of the first embodiment. However, the backlight module 8 includes a light guide plate 84, and two L-shaped light source assemblies 83. The light guide plate 84 includes four first grooves 842 respectively defined at four side surfaces 841 thereof. The four first grooves 842 are in communication with each other. Each light source assembly 83 includes an L-shaped light source 831. Each light source assembly 83 is fixedly accommodated in two corresponding adjacent first grooves 842.

Figure 9:
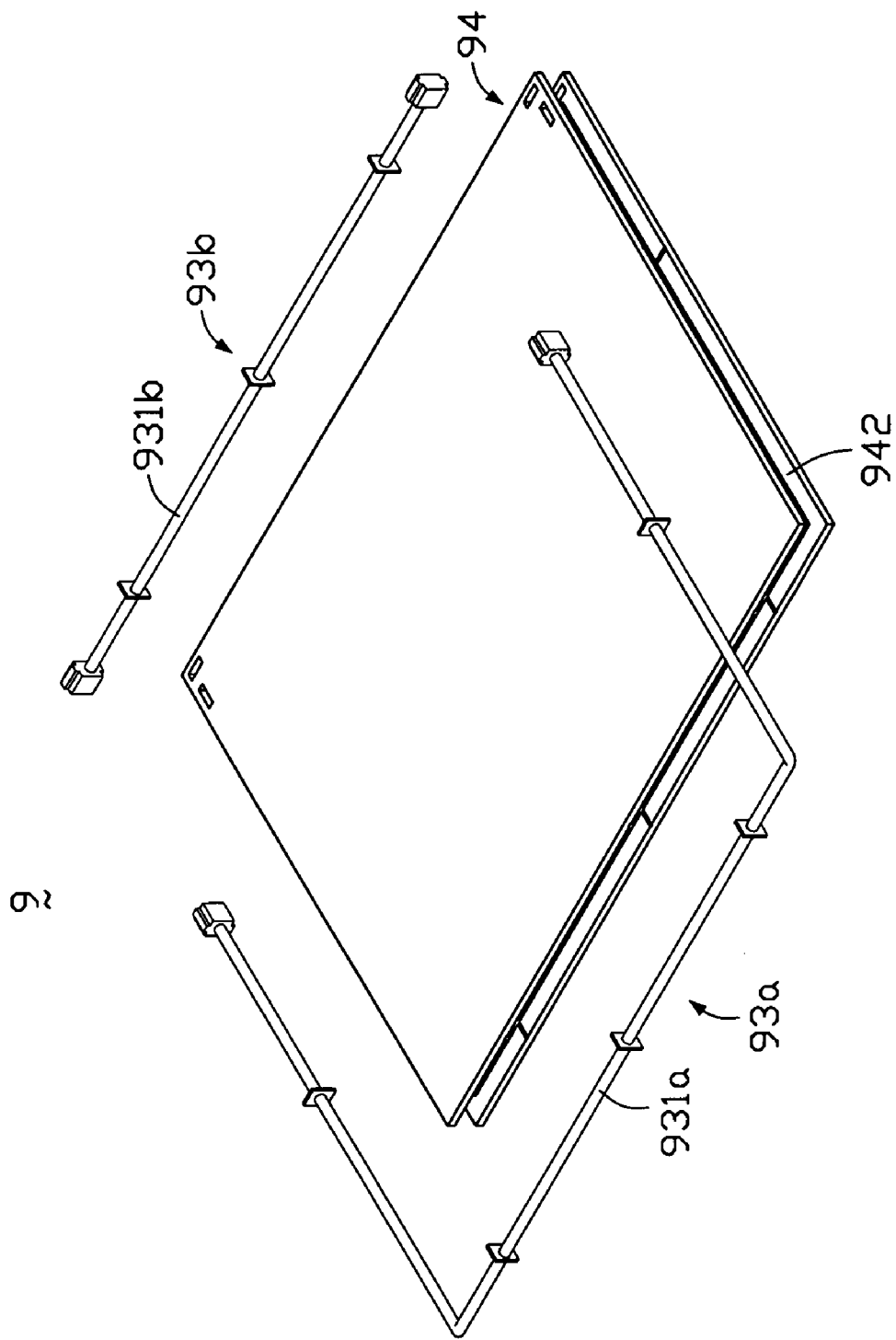
FIG. 9 is an exploded, isometric view of a backlight module according a seventh embodiment of the present invention.

Referring to FIG. 9, a backlight module according to a seventh embodiment of the present invention is similar to the backlight module 8 of the sixth embodiment. However, the backlight module 9 includes a U-shaped light source assembly 93a and a linear light source assembly 93b, instead of having the two L-shaped light source assemblies 83. The U-shaped light source assembly 93a includes a U-shaped light source 931a, and is fixedly accommodated in three contiguous first grooves 942 of a light guide plate 94. The linear light source assembly 93b includes a linear light source 931b, and is fixedly accommodated in a fourth first groove 942.

Figure 10:
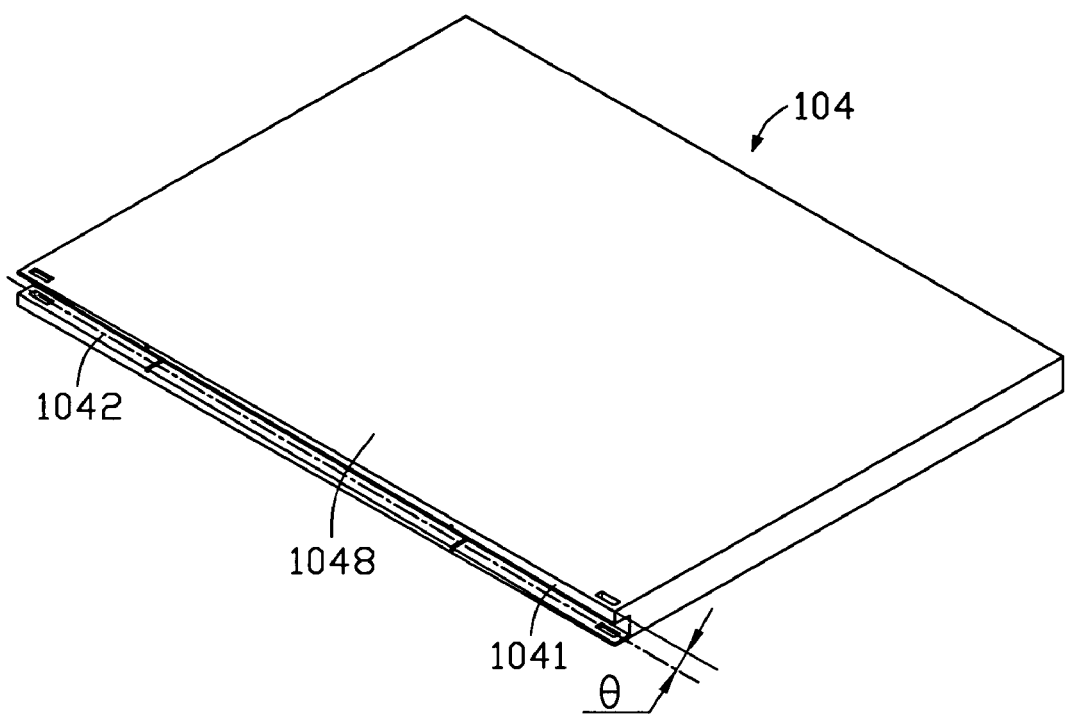
FIG. 10 is an isometric view of a light guide plate of a backlight module according an eighth embodiment of the present invention.
Figure 11:
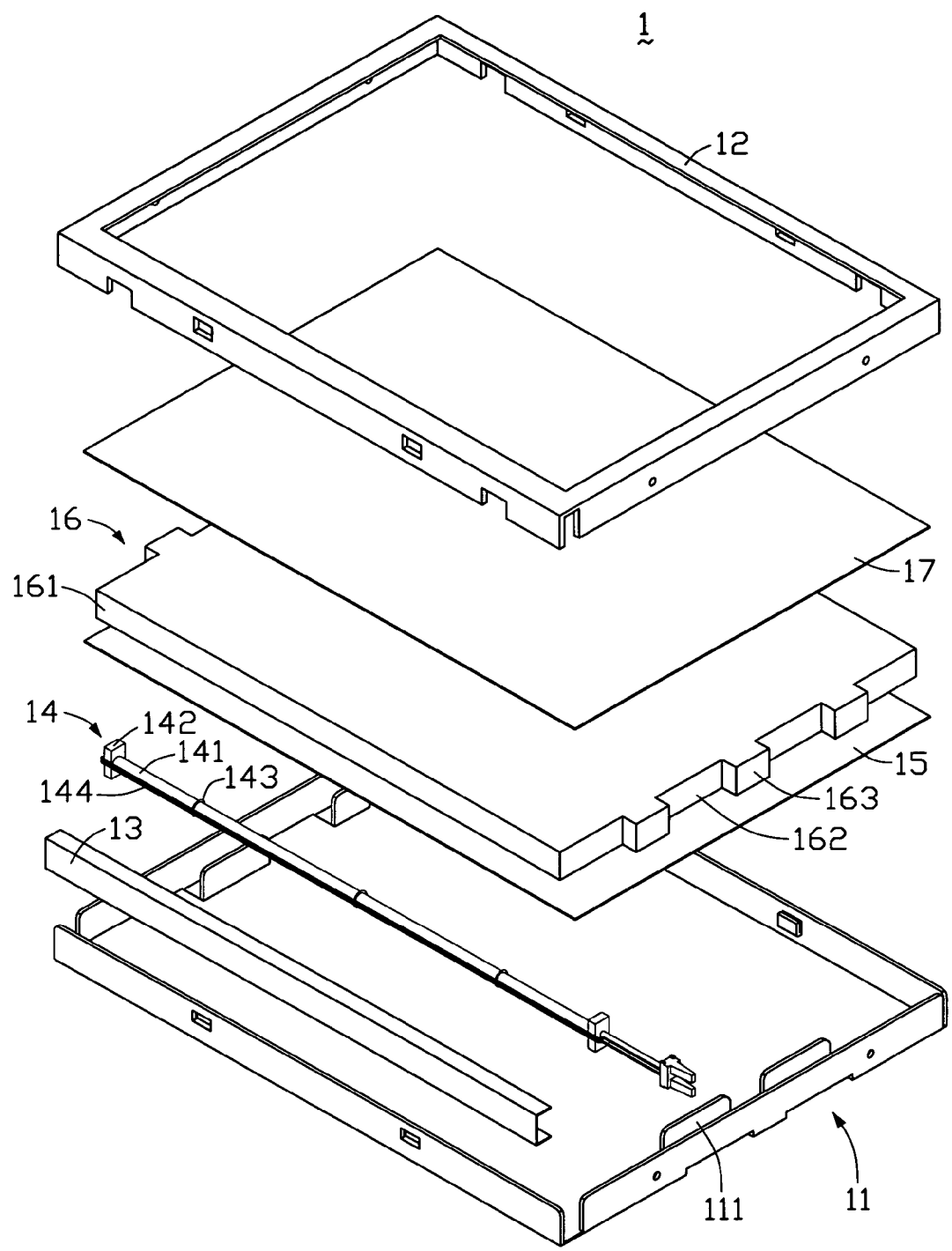
FIG. 11 is an exploded, isometric view of a conventional backlight module.
Figure 12:
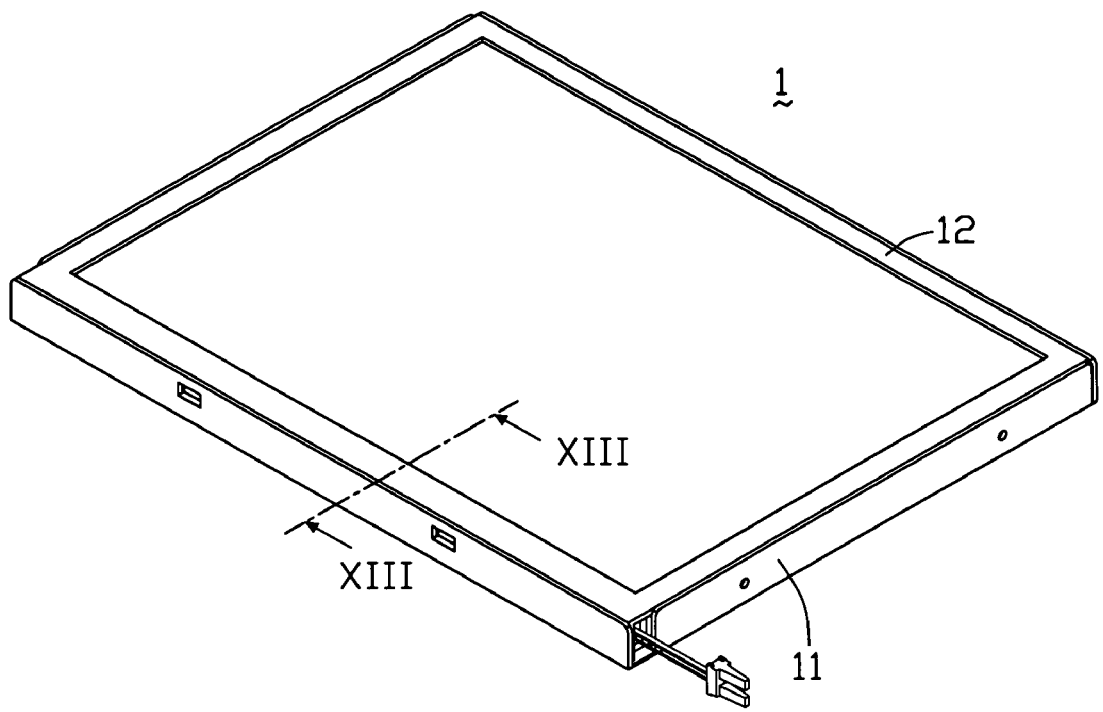
FIG. 12 is an assembled view of the backlight module of FIG. 11.
Figure 13:
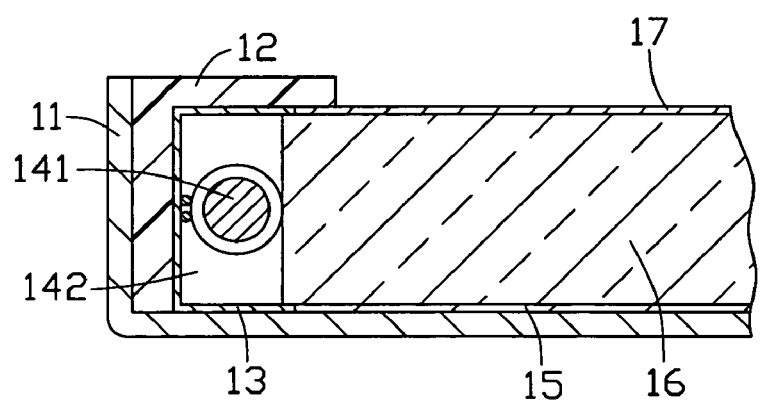
FIG. 13 is an enlarged, cross-sectional view taken along line XIII-XIII of FIG. 12.

FIG. 10 shows a light guide plate 104 of a backlight module according to an eighth embodiment of the present invention. The light guide plate 104 is similar to the light guide plate 34 of the first embodiment. However, the light guide plate 104 includes a side surface 1041, and a light emission surface 1048 perpendicularly adjoining the side surface 1041. A first groove 1042 is defined at the side surface 1041, for fixedly accommodating a light source assembly (not shown). A long axis of the first groove 1042 is oriented at a slight angle $\theta$ relative to the emission surface 1048. In the illustrated embodiment, the angle $\theta$ can be represented by an orientation of a top surface of a sidewall of the light guide plate 104 that bounds a bottom extremity of the first groove 1042, relative to the emission surface 1048. The angle $\theta$ is preferably in the range from 0-30 degrees.

Further alternative embodiments may include the following. Each light source assembly may instead be a bar having a plurality of light emitting diodes (LEDs) positioned thereon. Each light source assembly may instead include a plurality of separate LEDs, which are accommodated in a corresponding plurality of grooves defined at one or more side surfaces of the light guide plate.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A backlight module comprising:
   a light source assembly;
   a plurality of wires electrically connected to the light source assembly; and
   a light guide plate comprising:
      a side surface;

a light emission surface substantially perpendicular to the side surface;

a first groove defined at the side surface, the first groove fixedly accommodating the light source assembly; and a second groove located above and substantially parallel to the first groove, the second groove accommodating the wires.

2. A backlight module comprising:

a light source assembly;

a plurality of wires electrically connected to the light source assembly, the wires comprising high and low voltage wires; and a light guide plate comprising:

a side surface;

a light emission surface substantially perpendicular to the side surface;

a first groove defined at the side surface, the first groove fixedly accommodating the light source assembly;

a second groove located above and substantially parallel to the first groove, the second groove accommodating the high voltage wire; and a third groove located below and substantially parallel to the first groove, the third groove accommodating the low voltage wire.

3. A backlight module comprising:

a light source assembly;

a plurality of wires electrically connected to the light source assembly, the wires comprising high and low voltage wires; and a light guide plate comprising:

a side surface;

a light emission surface substantially perpendicular to the side surface;

a first groove defined at the side surface, the first groove fixedly accommodating the light source assembly;

a second groove located below and substantially parallel to the first groove, the second groove accommodating the high voltage wire;

a third groove located below and substantially parallel to the first groove, the third groove accommodating the low voltage wire.

* * * * *